United States Patent [19]

Talmage et al.

[11] 4,122,371

[45] Oct. 24, 1978

[54] CONTROL CIRCUIT FOR VEHICLE COMPARTMENT LIGHT

[75] Inventors: Dennis D. Talmage, Canton; James C. Byrne, Farmington Hills, both of Mich.

[73] Assignee: Gulf & Western Manufacturing Company, Southfield, Mich.

[21] Appl. No.: 817,709

[22] Filed: Jul. 21, 1977

[51] Int. Cl.$^2$ ............................................. B60Q 7/00
[52] U.S. Cl. ........................... 315/84; 307/10 LS; 315/77; 315/360; 362/80
[58] Field of Search ............... 315/82, 83, 84, 360, 315/362; 307/10 R, 10 LS; 362/74, 80, 182

[56] References Cited

U.S. PATENT DOCUMENTS

| | | | |
|---|---|---|---|
| 3,221,211 | 11/1965 | Murphy et al. | 315/84 |
| 3,530,333 | 9/1970 | Roberts | 315/83 |
| 3,546,527 | 12/1970 | Chunn et al. | 315/82 |
| 3,701,904 | 10/1972 | Gardner | 307/10 BP |
| 3,798,500 | 3/1974 | Florence et al. | 315/82 |
| 3,916,250 | 10/1975 | Brock et al. | 315/84 |
| 3,993,914 | 11/1976 | Conrad et al. | 307/10 LS |
| 4,071,805 | 1/1978 | Brock | 315/84 |

*Primary Examiner*—Saxfield Chatmon, Jr.
*Attorney, Agent, or Firm*—Meyer, Tilberry & Body

[57] ABSTRACT

Control circuit for shifting a compartment light between an illuminating condition and a non-illuminating condition for use in a vehicle having a door, a manually actuated door switch and a manually actuated control switch generally in combination with the ignition switch of the vehicle. The control circuit provides means for causing the compartment light to remain illuminated for a preselected time delay after the vehicle door has been closed and a second means for providing a different time delay holding the compartment light illuminated for a time after the control switch has been turned off.

24 Claims, 1 Drawing Figure

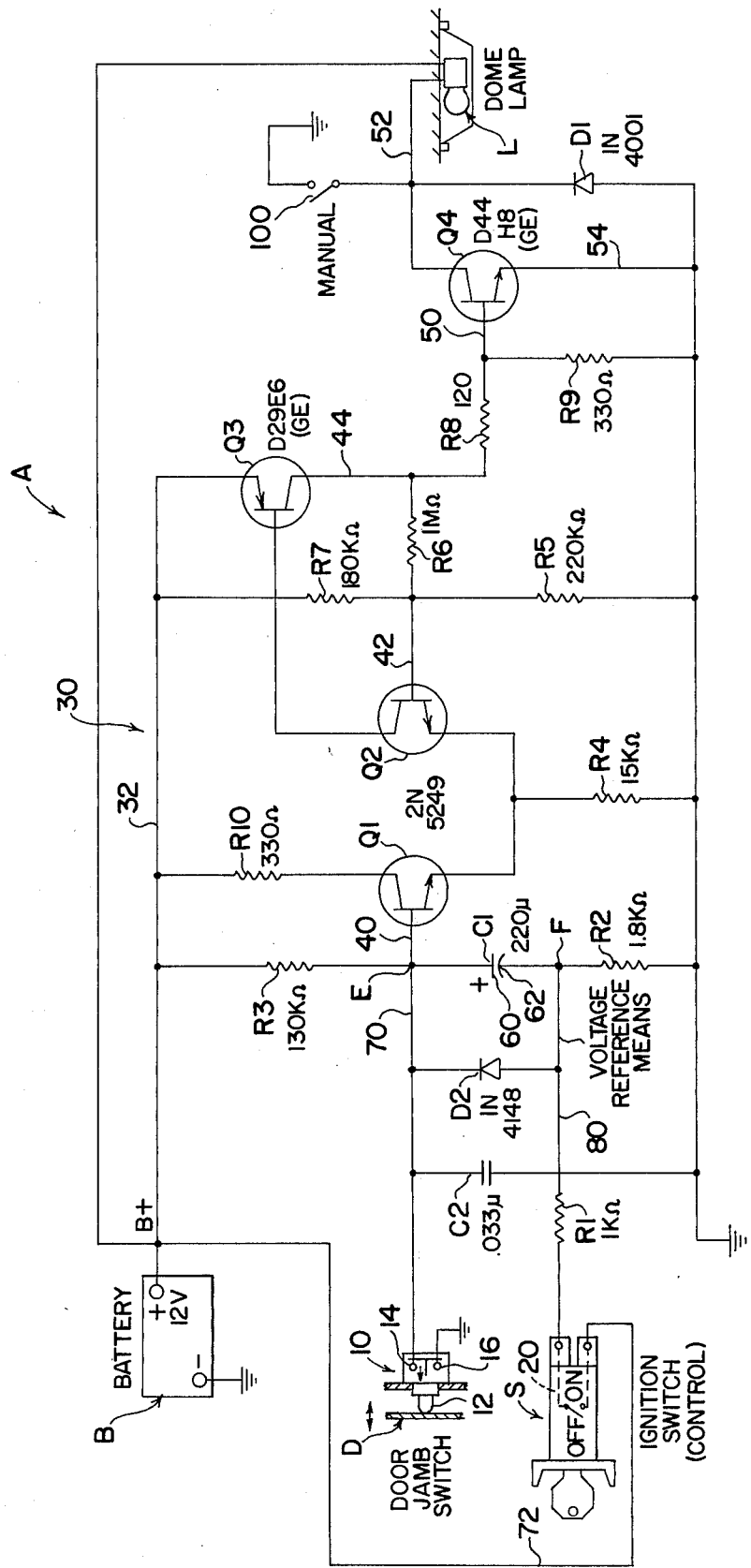

CONTROL CIRCUIT FOR VEHICLE COMPARTMENT LIGHT

The present invention relates to the art of control circuits for electrically controlling the compartment lights of a vehicle and more particularly to such a control circuit having dual time delay functions.

BACKGROUND OF THE INVENTION

Passenger vehicles generally include a compartment or dome light which is illuminated when the vehicle door is opened and extinguished when the vehicle door is closed. A manual switch within the vehicle can illuminate the compartment or dome light when the vehicle door is closed. Recently, it has become somewhat common practice to provide a time delay feature for the dome light. As the door is closed, the dome light, which may include more than one simultaneously operated lights, remains on for a preselected time. At first, these time delay devices employed relay or other mechanical contact circuits which required periodic maintenance and had to be replaced in some instances due to corrosion of the contacts and other deteriorating conditions. Since these systems control the dome light or lights, their deterioration often involves incapacitating the dome light itself which can be annoying and defeats the purpose of the time delay feature. To overcome the disadvantages of relay systems for controlling the time delay of the compartment or dome light operation, solid state timing circuits have been developed. These solid state timing circuits have often involved only a conversion of the basic relay circuitry into solid state components. Such systems have been used successfully; however, there is always a need from both a sales standpoint and a safety and convenience standpoint to provide improved circuitry for controlling the compartment or dome light or lights in a manner more concomitant with the actual needs of a passenger operating the vehicle.

THE INVENTION

The present invention relates to an improved solid state circuit for controlling the compartment or dome light or lights, which control circuit adds versatility to the operation of the compartment or dome light time delay function and provides an arrangement wherein both the door operated switch and a control switch associated with the ignition of the vehicle can control the time delay feature of the dome light. In this manner, the compartment or dome light can remain on a given time delay after the vehicle door has been closed. In addition, after the control switch associated with the ignition has been turned off, the compartment or dome light is again illuminated for a time delay allowing the passenger sufficient time to gather personal belongings and exit from the vehicle in a convenient manner with the dome light temporarily illuminating the passenger compartment.

In accordance with the present invention, there is provided a control circuit for accomplishing the above mentioned advantages, which control circuit includes an operating circuit having a voltage responsive input and an output having first and second output conditions. The first output condition extinguishes the compartment or dome light and the second output condition illuminates the compartment or dome light. A capacitor having first and second electrodes controls the voltage applied to the input of the operating circuit for shifting the operating circuit between the two illumination conditions. This capacitor is controlled by time constant means for causing the capacitor to change its voltage between the first and second electrodes in a preselected polarity direction and at a given rate. When the door actuated switch is shifted to the door open position, the first electrode of the capacitor is immediately shifted to a first control voltage which does not exceed the threshold voltage of the operating circuit and illuminates the light. When the door is closed, the door switch shifts to a second position which causes the operation of the time constant means to change the voltage across the capacitor from the first control voltage. Ultimately this shifts the operating circuit to the extinguishing condition in a time delay controlled by the time constant means. In addition, the present invention includes a voltage reference means which is responsive to the ignition controlled switch and controls the same capacitor. In accordance with the invention, actuation of the control switch immediately shifts the input of the operating circuit to the preselected level which extinguishes the compartment or dome light. When the control switch is later turned off, preparatory to the passenger leaving the vehicle, the capacitor is charged by the time constant means from a second control voltage which is greater than the door operated switch or first control voltage and less than the preselected threshold voltage. Thus, the compartment or dome light is illuminated for a shorter time period preparatory to the passenger leaving the vehicle. This second control biasing voltage provided by operation of the control switch shifts the voltage on the capacitor to a higher level for controlling the shorter time of the second time delay.

In accordance with another aspect of the present invention, the control circuit includes a differential amplifier having a biasing input in addition to the control input of the operating circuit. This biasing input is connected by a feedback arrangement with the output of a differential amplifier so that the differential amplifier is shifted between the illuminating and non-illuminating conditions rapidly in a manner enhancing the speed of saturation of the internal transistors in the amplifier when the operating circuit changes conditions. In this manner, less energy is dissipated, heat is maintained at a lower level and the transistors of the system are shifted between saturation and non-saturation without prolonged switching intervals.

A primary object of the present invention is the provision of a solid state control circuit for controlling the compartment or dome light of a passenger vehicle, which control circuit involves no mechanical contacts, is relatively inexpensive to produce, may be formed as a replacable module for easy assembly and replacement, does not deteriorate over prolonged periods of use, is not accessible to ambient conditions, is temperature stable, is silent in operation and is not generally susceptible to extraneous voltage transitions.

Another object of the present invention is the provision of a control circuit, as defined above, which circuit has a dual timing feature that provides a first time delay operated by a door controlled switch and a second time delay operated by the control or ignition switch of the vehicle.

Another object of the present invention is the provision of a control circuit, as defined above, which control circuit provides two separate time delays which may be controlled for the convenience of the vehicle operator.

Still a further object of the present invention is the provision of a control circuit as defined above, which control circuit includes a differential amplifier that has a feedback arrangement to control the biasing input and to increase the switching speed of the circuit.

These and other objects and advantages will become apparent from the following description.

BRIEF DESCRIPTION OF THE DRAWINGS

The single FIGURE is a wiring diagram and schematic layout illustrating the preferred embodiment of the present invention with parameters of various components listed.

PREFERRED EMBODIMENT

Referring now to the drawing wherein the showing is for the purpose of illustrating a preferred embodiment only and not for the purpose of limiting same, control circuit A is illustrated with various parameters for the components set forth after the various components. Circuit A is used to control the illumination and non-illumination condition of compartment or dome light L which is illuminated when the light is grounded and extinguished or non-illuminated when the light is not grounded. A battery B of a vehicle in which the compartment or dome light is located provides a given voltage, such as 12 volts D.C. A door D is movable between a door open position and a door closed position which controls the operation of door switch 10 of standard design having a plunger 12 operated by the door and contacts 14, 16. In the door closed position, contacts 14, 16 are opened by plunger 12, as illustrated. In the door open position, switch 10 is closed by plunger 12 to provide a ground through the switch. In a similar manner, a standard ignition switch has a control switch or contact 20, which is closed when the vehicle is being operated. Switch 20 has an actuated closed position to provide battery B+ voltage through the switch and a non-actuated position to open the switch when the vehicle is not being operated.

In accordance with the illustrated embodiment of the invention, the basic operating circuit 30 is in the form of a differential amplifier formed by standard transistors Q1, Q2 which are indicated to be 2N5249 transistors. The differential amplifier is connected between the B+, or positive, line 32 and chassis ground line 34. Resistor R10 is provided as a current limiting resistor, but does not have a sufficient voltage drop to saturate transistor Q1 during a steady state condition. Resistor R4 is provided as a current limiting resistor for this operating circuit or differential amplifier. In accordance with somewhat standard practice, the operating circuit includes a control input 40, which is the base of transistor Q1, a biasing input 42, which is the base of companion transistor Q2. The biasing voltage level is controlled by a voltage divider formed basically by resistors R5, R7. However, resistors R6, R8 and R9 somewhat modify the biasing point which is selected at approximately 7.0-7.6 volts D.C. The output of operating circuit 30 is transistor Q3 which can be somewhat standard; however, in the illustrated embodiment it is a General Electrid D29E6 transistor which has a relatively high gain and high current characteristic. The collector of transistor Q3 is connected to the basic output line 44 of control circuit 30. As can be seen, line 44 is shifted between the B+, or 12 volts, condition when the transistor is conducting and a near ground condition when the transistor is non-conducting. The condition of transistor Q3 is controlled by the voltage level on input 40 at the base of transistor Q1. Line 44 controls base 50 of transistor Q4 through a voltage divider formed primarily of resistors R8, R9. Transistor Q4 can be somewhat standard and, in the illustrated embodiment, it is a General Electric D44HB transistor of a relatively low saturation and a somewhat moderately high gain. When transistor Q4 receives base current from transistor Q3, lines 52, 54 are connected for grounding lamp L and causing the lamp to be illuminated. When transistor Q3 is off, the insufficient base current is provided at transistor Q4 so that transistor Q4 is non-conducting and lamp L is not grounded. This is the non-illuminating condition. Resistor R6 forces base 50 of transistor Q4 toward ground when transistor Q3 is non-conducting. If the voltage at the input 40 exceeds a preselected voltage level which is approximately 7.0-7.6 volts, transistor Q1 is on. This places the emitter of transistor Q2 close to the B+ level and causes it to be non-conducting. With Q2 off, Q3 is off and Q4 is off. Thus, with a voltage greater than approximately 7 volts at input 40, light L is extinguished.

In accordance with one aspect of the invention, the high value resistor R6 is used as a feedback from output line 44. As transistor Q3 starts its transition toward the off condition, there is a drop in voltage at line 44 as transistor Q3 starts its transition. This action reduces the current flow through resistor R6 to provide a positive feedback to cause rapid switching of transistor Q2 and, thus, transistor Q3. Consequently, the output transistor Q4 is switched off rapidly. This rapid switching action minimizes the time that the output transistor Q4 is in the high energy dissipation condition. Consequently, the dissipation of energy and the stress on transistor Q4 is minimized by the feedback between output 44 and biasing input 42 of operating circuit 30. When transistor Q2 is starting its on transition, the current is increased through resistor R6 by the transistor Q3 increasing the voltage on output line 44. This again is a positive feedback which causes a rapid transition or switching to the on condition for transistors Q2 and Q3. In a like manner, the transition to the on condition of transistor Q4 is at a higher rate determined by the positive feedback circuit from output line 44 to biasing input 42.

The voltage on input 40 controls the illumination condition of compartment or dome light L. When the voltage exceeds a preselected general value in a first polarity direction, which can be considered the negative direction, transistor Q1 is off, light L is on. If the voltage exceeds the threshold voltage in a second polarity direction, which can be considered the positive direction, transistor Q1 is on and light L is off. Instead of the polarity directions, the illustrated embodiment can be described with respect to only the positive polarity voltage level at point E, which is the input 40 of operating circuit 30. If this voltage exceeds the threshold voltage which is approximately 7.0-7.6 volts, transistor Q1 is on. If point E is below the threshold voltage, transistor Q1 is off.

In accordance with this invention, the voltage at point E is controlled by capacitor C1 having a first positive electrode 60 and a second negative electrode 62. Electrode 60 is connected to point E which is, in turn, connected to input 40. Of course, intermedaite circuits or resistors could be used without departing from the intended disclosure. As the voltage on electrode 60 changes, input 40 is modified to control light L.

Control circuit A controls the voltage on electrode 60 of capacitor C1 in two separate modes. The first mode is controlled by door switch 10. The second mode is controlled by control switch 20 incorporated into the standard ignition switch S of the vehicle. These two modes will be hereinafter described in a manner to illustrate their operating characteristics. In the door switch mode, line 70, which is connected to point E, is grounded when switch 10 is closed by opening door D. Contacts 14, 16 ground point E and discharge capacitor C1. Thus, first electrode 60 of the capacitor is grounded to chassis ground. This reduces the voltage at input 40 to the chassis ground to turn transistor Q1 off. As previously described, light L is turned on. The light is on until door D is closed. This opens switch 10 and allows line 70 and point E to float. A time constant circuit determined by resistors R2, R3 then charge capacitor C1 toward the B+ level. As the voltage at electrode 60 and point E exceeds the predetermined threshold voltage of approximately 7.0-7.6 volts, transistor Q1 is turned on. This turns light L off. The time necessary for this action is controlled by the RC time constant which in the preferred embodiment requires approximately 29 seconds to reach the threshold voltage. Generally, this time to reach threshold voltage is preferably in the range of about 20-40 seconds.

After the transistor Q1 is on and light L is off, following closing of the door, capacitor C1 continues to charge to a voltage level relatively close to the B+ voltage. In fact, this stabilized voltage is approximately 11.5 volts in the preferred embodiment. In summary, when the door is opened, the light L is illuminated. When the door is closed, a predetermined first time delay holds the light on or illuminated for a preselected time determined by the time constant means in charging capacitor C1.

Referring now to the second mode of operation, when the vehicle is being operated its ignition switch S is actuated. This closes control switch 20 and applies the B+ voltage from line 72 to line 80 which includes resistor R1. This activates a voltage reference means or biasing voltage means for the second electrode 62 of capacitor C1. Point F is at the intermediate point of a voltage divider including resistors R1, R2. In accordance with one aspect of the invention, point F is at a voltage causing input 40 to exceed its threshold voltage. Thus, actuation of switch 20 immediately turns transistor Q1 on and light L off. In the preferred embodiment, point F is approximately 8.25 volts when switch 20 is closed. This substantially exceeds the 7.0-7.6 volts necessary for extinguishing the light L. Thus, when the switch 20 is actuated, light L is turned off irrespective of whether or not the timing function associated with the door actuation mode has expired. In this manner, light L is turned off as soon as the ignition switch is turned on. Consequently, the vehicle operator need not be concerned about the dome light being on as the engine is being started. When the vehicle operator turns off the engine, switch 20 is opened. This drops point F to approximately chassis ground. The voltage difference between points E and F prior to grounding point F is then applied to input 40. This is less than the threshold amount. In practice, the voltage is of approximately 3.25 volts. For that reason as soon as switch 20 is turned off, transistor Q1 is turned off. This turns on light L for a time determined by the time necessary to charge capacitor C1 back to the threshold voltage for input 40. This time is decreased from a door actuated time delay since the starting voltage is determined by the voltage between point F and point E. In practice, this voltage is approximately 3.25 volts. Of course, other voltage differentials could be used. When switch 20 is closed, point F is at a sufficiently high voltage to extinguish light L. In this instance, the voltage across capacitor C1 is insufficient to maintain this extinguished condition without the voltage level at point F. Thus, when point F is grounded, the threshold of input 40 is not reached. A time delay substantially less than the time delay for the door operated mode is thus required before transistor Q1 is turned on and light L is turned off. The difference in time is determined by the reference voltage or biasing voltage applied to point F during actuation of switch 20.

As long as door D is open, light L is on. If the door is closed and switch 20 is actuated, this immediately turns the light off until the ignition controlled switch 20 is not actuated, which gives a shortened time delay for the illumination by compartment or dome light L. Consequently, when the vehicle operator is ready to exit the vehicle, there is a short period of time when the compartment or dome light is on.

Switch 100 is a manual switch which overrides circuit A so that light L may be shifted to the illuminating condition, irrespective of the condition of circuit A. In the FIGURE, certain other components are shown for use in the illustrated embodiment. Capacitor C2 prevents oscillation when certain inductive loads and supply voltage modulations occur. These modulations could be caused by certain resistive characteristics of the contacts used in connecting the module carrying circuit A into the vehicle or to the various components such as battery B, switch 10, switch 20, and light L. Diode D2 provides a path for raipd discharge of capacitor C1 to the second timing function voltage level and also prevents negative voltages from being applied across the polarized terminals of control capacitor C1. In a similar manner, diode D1 protects output transistor Q4 from negative voltages. Resistor R10 serves two functions. The first function is to protect the collector-base junction of input transistor Q1 against negative voltage transients by limiting, to acceptable levels, the power dissipated by transistor Q1 during these transients. In addition, this resistor limits the standby current drain as drawn from the battery B when the circuit 30 is not operating. Consequently, this limits the power dissipation during steady state conditions of circuit A.

Having thus described the invention, the following is claimed:

1. A control circuit for shifting a compartment light of a vehicle having a door, a manually actuated door switch with a door open position and a door closed position and a control switch having an actuated position and a non-actuated position, said shifting being between an illuminating position of said light and a non-illuminating position of said light, said control circuit including an operating circuit having a voltage responsive input and an output having first and second output conditions, means responsive to the voltage at said input exceeding a predetermined general level in a first polarity direction for causing said first output condition and responsive to the voltage at said input exceeding said predetermined general level in a second polarity direction opposite to said first polarity direction for causing said second output condition; means responsive to said first output condition for shifting said light into said non-illuminating condition and responsive to said second output condition for shifting said light into said illuminating condition; a capacitor having first and second electrodes; means connecting said first electrode to said input for controlling the voltage at said input; time constant means for causing said capacitor to change its voltage between said first and second electrodes in a change direction from said second polarity direction to said first polarity direction at a given rate; means responsive to shifting said door switch into said door open position for immediately causing said first electrode to have a ground, causing a voltage at said input exceeding said general level in said second polarity direction; means responsive to shifting said door switch into said door closed position for causing operation of said time constant means whereby said capacitor changes its charge at said rate and the voltage at said first electrode changes from said first control voltage to a voltage causing said input to have a voltage exceeding said general level in said first polarity direction in a first preselected time substantially greater than instantaneously; voltage reference means for controlling the voltage on said second electrode; and said voltage reference means includes means responsive to manually shifting said control switch to said actuated position for immediately shifting said second electrode in a first polarity direction a first reference voltage amount assuming that said input has a voltage exceeding said given level at least after said preselected time, means responsive to manually shifting said control switch to said non-actuated position for shifting said second electrode in said second polarity direction a second reference voltage amount causing said first electrode to have a second control voltage causing a voltage at said input exceeding said general level in said second polarity direction and means for then allowing operation of said time constant means whereby said capacitor changes its charge at said rate and the voltage at said first electrode changes from said second control voltage to a voltage causing said input to have a voltage exceeding said general level in said first polarity direction in a second preselected time substantially greater than instantaneous.

2. A control circuit as defined in claim 1, wherein said second control voltage is substantially less in said second polarity direction than said first control voltage.

3. A control voltage as defined in claim 1, wherein said first polarity direction is positive and said time constant means includes means for charging said capacitor in the positive voltage direction.

4. A control circuit as defined in claim 1, wherein said first preselected time is in the general range of about 20-40 seconds.

5. A control circuit as defined in claim 4, wherein said second preselected time is in general range of about 10-20 seconds.

6. A control circuit as defined in claim 1, wherein said second preselected time is in the general range of about 10-20 seconds.

7. A control circuit as defined in claim 1, wherein said operating circuit is a differential amplifier having said input, said output, a biasing input and means for controlling the voltage on said biasing input.

8. A control circuit as defined in claim 7, including a current feedback means between said output and said biasing input for causing said biasing input to follow said first and second output conditions.

9. A control circuit as defined in claim 1, including means for creating said first reference voltage amount to a level sufficient to cause said input to have a voltage exceeding said given level upon shifting of said control switch to said actuated position.

10. A control circuit for shifting a compartment light of a vehicle having a manually actuated door switch with a door open position and a door closed position and a control switch having an actuated position and a non-actuated position, said shifting being between an illuminating condition of said light and a non-illuminating condition of said light, said control circuit including an operating circuit with an input, an output, means for shifting said output to a first output condition when said input receives a voltage exceeding a predetermined general level and means for shifting said output to a second condition when said input receives a voltage less than said predetermined general level; means responsive to one of said output conditions for shifting said light to said illuminating condition and responsive to the other of said output conditions for shifting said light to said non-illuminating condition; a capacitor having first and second electrodes; means for connecting said first electrode to said input of said operating circuit whereby the voltage of said first electrode controls the voltage received by said input; means responsive to manual operation of said door switch to said door open position for creating a voltage level on said first electrode sufficient to cause said input to shift said output to said one of said output conditions in a given time; means responsive to manual operation of said door switch to said door closed position for creating a voltage level on said first electrode sufficient to cause said input to shift said output to the other of said output conditions in an operating time substantially greater than said given time; and means responsive to manual operation of said control switch from said actuated position to said non-actuated position for creating a voltage on said first electrode sufficient to cause said input to shift said output to said other of said output conditions in a time substantially greater than said given time and substantially less than said operating time.

11. A control circuit as defined in claim 10, including means responsive to manual operation of said control switch to said actuated position for immediately creating a voltage on said first electrode sufficient to cause said input to shift said output to said other of said output conditions.

12. A control circuit as defined in claim 11, wherein manual operation of said control switch from said actuated position to said non-actuated position applies a biasing voltage to said second electrode of said capacitor.

13. A control circuit for shifting a compartment light of a vehicle having a manually operated door and a door controlled switch between an illuminating condition and a non-illuminating condition, said control circuit comprising a differential amplifier having a first input terminal, a second input terminal and an output terminal shifted between a first output condition when a voltage applied to said first input terminal exceeds a preselected general level and a second output condition when a voltage applied to said first input terminal is below said general level; means responsive to one of said output conditions for causing said light to shift to said illuminating condition and responsive to the other of said output conditions for causing said light to shift to said non-illuminating condition; means for applying a biasing voltage to said second input terminal for controlling said preselected general level; a capacitor network connected to said first input terminal, said capacitor having first control means for discharging said capacitor to a given low voltage level substantially below said predetermined given level at a first rate and second control means for charging said capacitor above said given level at a second rate; means for actuating a first of said control means when said door actuated switch is actuated in a given position; means for causing said rate of said first of said two control means to be high compared to the rate of the second of said control means; means for actuating the second of said two control means after actuation of said first of said two control means; and feedback means responsive to each of said output conditions for controlling current flow to said second input terminal whereby the speed of shifting between said illuminating and non-illuminating conditions is increased.

14. A control circuit as defined in claim 13, wherein said means for actuating said second of said two control means after actuation of the first of said control means includes means responsive to closing of said vehicle door.

15. A control circuit as defined in claim 14, wherein said first of said two control means is said second control means and said second rate is substantially higher than said first rate.

16. A control circuit as defined in claim 13, wherein said first of said two control means is said second control means and said second rate is substantially higher than said first rate.

17. A control circuit as defined in claim 16, wherein said vehicle includes a control switch shiftable between an actuated position and a non-actuated position, and further including means for shifting said output terminal to said other of said output conditions when said control switch is shifted to said actuated position; means responsive to shifting of said ignition switch to said non-actuated position for applying a voltage greater than said given low voltage level and less than said predetermined given voltage level; and, means responsive to shifting of said control switch to said non-actuated position for also operating the second of said two control means.

18. A control circuit as defined in claim 13, wherein said vehicle includes a control switch shiftable between an actuated position and a non-actuated position, and further including means for shifting said output terminal to said other of said output conditions when said control switch is shifted to said actuated position; means responsive to shifting of said ignition switch to said non-actuated position for applying a voltage greater than said given low voltage level and less than said predetermined given voltage level; and, means responsive to shifting of said control switch to said non-actuated position for also operating the second of said two control means.

19. A control circuit as defined in claim 14, wherein said vehicle includes a control switch shiftable between an actuated position and a non-actuated position, and further including means for shifting said output terminal to said other of said output conditions when said control switch is shifted to said actuated position; means responsive to shifting of said ignition switch to said non-actuated position for applying a voltage greater than said given low voltage level and less than said predetermined given voltage level; and, means responsive to shifting of said control switch to said non-actuated position for also operating the second of said two control means.

20. A control circuit as defined in claim 15, wherein said vehicle includes a control switch shiftable between an actuated position and a non-actuated position, and further including means for shifting said output terminal to said other of said output conditions when said control switch is shifted to said actuated position; means responsive to shifting of said ignition switch to said non-actuated position for applying a voltage greater than said given low voltage level and less than said predetermined given voltage level; and, means responsive to shifting of said control switch to said non-actuated position for also operating the second of said two control means.

21. A control circuit as defined in claim 13, wherein said means for actuating said second of said two control means after actuation of said first of said two control means includes means responsive to actuation of said door actuated switch into a position different from said given position.

22. A control circuit as defined in claim 13, including means responsive to opening of said vehicle door for actuating said door actuated switch into said given position.

23. A control circuit as defined in claim 22, including means responsive to closing of said vehicle door for actuating said door actuated switch into said different position.

24. A control circuit for shifting a compartment light of a vehicle having a door, a manually actuated door switch with a door open position and a door closed position and a control switch having an actuated position and a non-actuated position, said shifting being between an illuminating position of said light and a non-illuminating position of said light, said control circuit including an operating circuit having a voltage responsive input and an output having first and second output conditions, means responsive to the voltage at said input exceeding a predetermined general level in a first polarity direction for causing said first output condition and responsive to the voltage at said input exceeding said predetermined general level in a second polarity direction opposite to said first polarity direction for causing said second output condition; means responsive to said first output condition for shifting said light into said non-illuminating condition and responsive to said second output condition for shifting said light into said illuminating condition; a capacitor having first and second electrodes; means connecting said first electrode to said input for controlling the voltage at said input; time constant means for causing said capacitor to change its voltage between said first and second electrodes in a change direction from said second polarity direction to said first polarity direction at a given rate; means responsive to shifting said door switch from said door open position to said door closed position for causing operation of said time constant means between a first control voltage below said predetermined given voltage to a voltage generally equaling said given voltage; means responsive to switching said control switch to said actuated position for creating a first voltage on said second electrode generally greater than said given voltage and a second voltage across said capacitor electrodes substantially less than said given voltage; means responsive to shifting said control switch to said non-actuated position for connecting said second electrode to a voltage source having a level which added with said second voltage produces a voltage sum substantially less than said given voltage; and means also responsive to shifting of said control switch to said non-actuated position for causing operation of said time constant means generally between said voltage sum and said given voltage.

* * * * *